Patented Feb. 8, 1949

2,460,865

UNITED STATES PATENT OFFICE 2,460,865

MANUFACTURE OF TRICHLOROMETHYL DIARYLMETHANES

Charles Eugene Wilson, Jr., Denver, Colo., assignor to E. I. du Pont de Nemours & Company, Wilmington, Del., a corporation of Delaware No Drawing. Application December 14, 1944, Serial No. 568,210

4 Claims. (Cl. 260—649)

This invention relates to the manufacture of trichloromethyl diaryl methanes and is particularly directed to processes for effecting condensation of chloral-yielding compounds and aromatic compounds having replaceable nuclear hydrogen in the presence of sulfuric acid.

It has recently been discovered that the trichloromethyl diaryl methane compounds are effective for the control of certain insect pests and of consequence the manufacture of these compounds, particularly 2,2 - bis(p-chlorophenyl) - 1,1,1-trichloroethane, commonly called DDT, has become of considerable interest.

It is an object of the invention to provide improved processes for the manufacture of these compounds. Other objects of the invention are to avoid certain difficulties of the prior art, as will be pointed out, and to obtain certain advantages as will become apparent. Further objects will appear as the description proceeds.

It is known that when chloral is condensed with an aromatic compound having replaceable hydrogen by means of sulfuric acid there is obtained a product of the trichloromethyl diaryl methane type. Ber., 5, 1098; Ber., 7, 1181; U. S. 1,707,181; and U. S. 2,329,074. By condensing chloral and monochlorobenzene there is obtained 2,2-bis(p-chlorophenyl) - 1,1,1 - trichloroethane, which has been found to be of outstanding value for the control of certain insect pests. The product of the condensation is not the pure compound but is a mixture consisting largely of the para,-para-isomer [2,2-bis(p-chlorophenyl)-1,1,1-trichloroethane] melting at 107–108° C. with the remainder made up largely of the ortho, para-isomer melting at 72–74° C. Similar mixtures of isomers are obtained with other aromatic compounds having replaceable ortho and para hydrogen. The proportion of these isomers varies according to the details of the process. It is an object of the invention to provide processes which give a high yield of the para,para-isomer.

The mixture of isomers obtained in such a condensation has no sharp melting point and is usually of such a wide range that melting point determinations are extremely difficult and in general unsatisfactory. Reproducible results which give a fairly accurate indication of the quality of the crude may be obtained, however, by determining the setting point by the cooling curve method. As the setting point is considered an index of the quantity of para,para-isomer, it is an object of the invention to provide ways and means of improving the setting point.

In effecting condensation with sulfuric acid there concurrently takes place a sulfonation reaction of the aromatic compound in varying amounts according to the temperature, according to the concentration of the acid, and in general according to the conditions of the reaction. In the past this sulfonation has been considered undesirable, the sulfonation representing a complete loss of the aromatic compound and sulfuric acid involved. This invention has for an object the utilization of this sulfonation reaction to accomplish a useful purpose.

These objects are accomplished in the present invention by effecting condensation of a chloral-yielding compound and an aromatic compound having replaceable nuclear hydrogen in the presence of sulfuric acid containing the sulfonic acid of said aromatic compound in a quantity in excess of that formed in situ.

In carrying out the processes according to the invention the condensation between the chloral-yielding compound and the aromatic compound having replaceable hydrogen may be effected in any suitable procedure with sulfuric acid of a strength suitable for the condensation. Illustrative processes are given in the prior art noted above. While excellent results are obtained by these processes it is desirable to effect the reaction in the presence of a substantial excess of the aromatic compound, and especially so when the aromatic compound is a liquid. However the process is carried out it is characteristic of the present invention that it is carried out in the presence of an added quantity of the by-product sulfonic acid (or acids) of the reaction. This may be accomplished by adding the requisite quantity of aromatic sulfonic acid or by recycling spent acid from a previous condensation.

It is of particular advantage to carry out the processes of the invention by recycling spent acid from a previous operation. To effect this the requisite quantity of spent acid from one operation is reserved for effecting a subsequent operation. A suitable procedure is to effect a rough separation between the acid and organic phases by allowing the batch to settle for a short time and withdrawing the top organic layer plus all of the acid layer not required for the next batch. The required amount of spent acid is thus left in the reactor ready for the next batch. Otherwise separation may be effected in the ordinary manner and sufficient of the spent acid set aside for charging the reactor for a subsequent batch. In the repetition of this step of the procedure the sulfonic acid content of the spent acid builds up to a specific maximum value which is determined by the amount of sulfonic acid produced in each operation and the proportion of the spent acid recycled. As the content of sulfonic acid builds up there is simultaneously observed an increase in the set point of the product produced. Thus in accordance with the invention the by-product sulfonic acid which heretofore has been a total loss performs useful work.

The invention may be more fully understood by reference to the following examples in which the parts are by weight unless otherwise specified:

Example

*Batch A.*—Into a suitable reactor provided with means for agitating the reaction mixture and for cooling it there was introduced 300 pounds of chloral and 540 pounds of monochlorobenzene. To this mixture, with agitation and cooling, there was added 53⅓ gallons of spent acid which was set aside from the previous operation which used 98% acid instead of spent acid. This spent acid has a strength of 95.5 to 96% sulfuric acid on an organic-free basis and contains approximately 20% of organic matter composed largely of monochlorobenzene sulfonic acid. The temperature of the reaction mixture was maintained at 65–75° F. during the addition of the spent acid. 1050 pounds of 20 percent oleum (104.5% strength) was started at 3:40 p. m. and continued until 8:45 p. m. At 6:35 p. m. 100 pounds of monochlorobenzene was added and further additions of 100 pounds each of monochlorobenzene were made at 7:00, 7:45, 8:45, and 9:45 p. m., making in all a total of 1040 pounds of monochlorobenzene introduced into the reactor. These 100-pound additions of monochlorobenzene were made as required to dissolve precipitates and to maintain the product in solution. The charge was allowed to react for three hours after the last of the oleum had been added, after which the temperature was raised to 105° F. After settling for an hour the spent acid was withdrawn from the monochlorobenzene solution of the product and 53⅓ gallons were set aside for the next batch. The monochlorobenzene solution was washed, neutralized, and distilled to remove monochlorobenzene and water. The product had a set point of 89.4° F.

*Batch B.*—The spent acid reserved in batch A was utilized in accordance with the procedure described in batch A. Addition of the oleum was started at 4:15 a. m. and continued through 10:30 a. m. 100-pound additions of monochlorobenzene were made at 7:30 a. m., 7:50 a. m., 9:15 a. m., 9:45 a. m., 12:15 p. m., and a final 50-pound addition was made at 2:15 p. m. The product obtained had a set point of 90.2° F.

*Batch C.*—The spent acid of batch B was utilized in accordance with the procedure of batch A. The oleum addition was started at 4:55 p. m. and was completed at 10:50 p. m. Additions of 100 pounds of monochlorobenzene were made at 8:00 p. m., 8:35 p. m., 9:05 p. m., and 9:45 p. m. The product had a set point of 90.9° F.

As the operation is continued from batch to batch as illustrated, the concentration of monochlorobenzene sulfonic acid in the spent acid builds up to a maximum which is determined by the amount of chlorobenzene formed in the batch and the proportion recycled. How quickly a condition of equilibrium is obtained depends upon the proportion of the spent acid recycled. Under the conditions of the example where approximately one third of the spent acid is recycled, the concentration of organic matter in the spent acid is within one or two degrees of equilibrium. By using a stronger oleum the percentage of organic matter in the equilibrium acid may be increased. With a weaker oleum or acid the percent decreases.

It will be observed that as the concentration of organic matter in the spent acid increases toward equilibrium the set point of the product increases from about 89° C. to about 91° C. When the same chloral is processed in essentially the same manner, using 98% sulfuric acid instead of recycled spent acid, the set point was 88.3° C. Thus by recycling the spent acid a substantial improvement in the quality of product is obtained and a by-product of the reaction, monochlorobenzene sulfonic acid, otherwise without value is put to use.

In place of chloral there may be substituted other chloral-yielding compounds such as chloral hydrate, chloral alcoholate, and chloral acetal. These materials yield chloral in the presence of sulfuric acid and consequently may be substituted in the reaction if suitable adjustment is made for the amount of water liberated and the amount of sulfuric acid thus used in converting the material to chloral. The reaction proceeds simply as if it were the reaction between chloral and the aromatic compound and the other materials may be considered, in effect, as alternative ways of introducing chloral into the reaction mixture.

In place of chlorobenzene there may be substituted other aromatic compounds having replaceable hydrogen, especially those which contain groupings, such as chlorine, bromine, iodine, fluorine, hydroxy, methyl, ethyl, or other alkyl groups, and methoxy and ethoxy and other alkoxy groups, which direct replacement of ortho and para hydrogen. It is within the scope of the invention to substitute such compounds as benzene, fluorobenzene, bromobenzene, iodobenzene, methoxybenzene, phenetol, phenol, toluene, metaxylene, ethyl benzene, naphthalene, tetrahydronaphthalene, and like homologues and derivatives of benzene. It is with aromatic compounds having replaceable ortho and para hydrogen that the invention is particularly applicable in view of the high proportion of isomers which is likely to occur with such compounds. But the invention is not so limited and some of the advantages thereof are obtained with other types of aromatic compounds having replaceable hydrogen.

In place of or in addition to recycling spent acid the appropriate aromatic sulfonic acid may be added. If the spent acid is diluted and allowed to stand the aromatic sulfonic acid separates out and may be recovered and returned to the process. Since only a portion of the spent acid can be recycled there is provided ample waste acid for this treatment. The aromatic sulfonic acid thus recovered may be added also to the oleum used in the reaction. Thus, in the axample, if the waste acid is diluted to about 80% strength, crystals of monochlorobenzene sulfonic acid separate probably as the hydrate. These may be filtered off and added to the recycled spent acid or to the oleum. In this manner it is possible to carry out the reaction in the presence of any desired amount of monochlorobenzene sulfonic acid even up to a saturated solution.

While I have described my invention with reference to particular conditions, it will be understood that it is not limited to the particular details of the example but that variation may be made in proportions, concentrations, mode of addition, separation, and recovery, and in other respects without departing from the spirit and scope of the invention.

I claim:

1. A process for the manufacture of a trichloromethyl diaryl methane which comprises condensing a chloral yielding compound with an aromatic compound having replaceable nuclear hydrogen in the presence of both sulfuric acid and an added quantity of the sulfonic acid of said aromatic compound.

2. A process for the manufacture of 2,2-bis(p-chlorophenyl)-1,1,1-trichlorethane which comprises condensing a chloral yielding compound with monochlorobenzene in the presence of both sulfuric acid and an added quantity of monochlorobenzene sulfonic acid.

3. A process for the manufacture of a trichloromethyl diaryl methane which comprises condensing a chloral yielding compound with an aromatic compound having replaceable nuclear hydrogen in the presence of sulfuric acid consisting of spent sulfuric acid from a previous condensation of a chloral yielding compound with an aromatic compound having replaceable nuclear hydrogen refortified with stronger sulfuric acid.

4. A process for the manufacture of 2,2-bis(p-chlorophenyl)-1,1,1-trichloroethane which comprises condensing a chloral yielding compound with monochlorobenzene in the presence of sulfuric acid consisting of spent sulfuric acid from a previous condensation of a chloral yielding compound with monochlorobenzene refortified with stronger sulfuric acid.

CHARLES EUGENE WILSON, JR.

REFERENCES CITED

The following references are of record in the file of this patent:

UNITED STATES PATENTS

| Number | Name | Date |
| --- | --- | --- |
| 2,329,074 | Muller | Sept. 7, 1943 |

OTHER REFERENCES

Groggins: "Unit Processes in Organic Synthesis," page 221 (1935).